United States Patent
Sulzbach et al.

(10) Patent No.: US 6,890,967 B2
(45) Date of Patent: May 10, 2005

(54) METHOD FOR PRODUCING RADICALLY POST-CROSS-LINKED POLYMERS

(75) Inventors: Horst Sulzbach, Duesseldorf (DE); Ralf Bemmann, Neuss (DE); Rainer Hoefer, Duesseldorf (DE); Michael Skwiercz, Langenfeld (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 16 days.

(21) Appl. No.: 10/182,503

(22) PCT Filed: Jan. 22, 2001

(86) PCT No.: PCT/EP01/00645

§ 371 (c)(1),
(2), (4) Date: Nov. 22, 2002

(87) PCT Pub. No.: WO01/55240

PCT Pub. Date: Aug. 2, 2001

(65) Prior Publication Data

US 2003/0134928 A1 Jul. 17, 2003

(30) Foreign Application Priority Data

Jan. 28, 2000 (DE) .......................... 100 03 749

(51) Int. Cl.$^7$ ................. C08G 18/04; C08G 18/06; C08G 71/04
(52) U.S. Cl. .................... 522/93; 522/92; 522/96; 525/454; 525/455; 528/74.5; 528/75
(58) Field of Search .................. 522/92, 93, 96; 525/454, 455; 528/74.5, 75

(56) References Cited

U.S. PATENT DOCUMENTS 3,979,270 A    9/1976  Trecker et al.
4,224,369 A    9/1980  Borden et al.
5,399,294 A    3/1995  Quednau

FOREIGN PATENT DOCUMENTS

EP    0 438 836 B1    7/1991
JP    63 020316 A     1/1988

OTHER PUBLICATIONS

Manfred Bock, (Ed. Ulrich Zorll), "Polyurethane für Lacke und Beschichtungen", Hannover, (1999), pp. 73–74.

Ullmanns Encyklopädie der technischen Chemie, vol. 19, 4th Edition, Weinheim, (1980), pp. 303–304.

Kirk–Othmer, Encyclopedia of Chemical Technology, 4th Edition, John Wiley & Sons, New York, (1995), vol. 14, pp. 902–934.

Gerhard W. Becker (Ed.), Kunststoff–Handbuch, vol. 7, "Polyurethane", (edited by Günter Oertel), 3rd Edition, Carl Hanser Verlag, Munich, (1993), pp. 11–21, 76–103.

*Primary Examiner*—Jeffrey Robertson
(74) *Attorney, Agent, or Firm*—Aaron R. Ettelman; Daniel S. Ortiz

(57) ABSTRACT

Radically post-crosslinked polymers are made by a process comprising the steps of: (1) forming a polyurethane (a*) by reacting a compound (a) with an aliphatic and/or an aromatic isocyanate and a compound (c) wherein compound (a) is the product of the reaction of an epoxidized fatty acid ester and/or an epoxidized triglyceride with acrylic acid and/or methacrylic acid and wherein compound (c) is a polyol ester having two or more C=C double bonds per molecule; (2) forming a crosslinked polyurethane by reacting the polyurethane (a*) with a radical initiator (b). The polymers are useful as components in composites comprised of natural and/or synthetic fibers.

5 Claims, No Drawings

METHOD FOR PRODUCING RADICALLY POST-CROSS-LINKED POLYMERS

BACKGROUND OF THE INVENTION

This invention relates to a process for the production of radically post-crosslinked polymers. In the process according to the invention, one or more special acrylic or methacrylic acid derivatives based on naturally occurring oils is/are reacted with aromatic and/or aliphatic isocyanates and the polyurethanes thus obtained are subsequently subjected to radical post-crosslinking in the presence of a radical initiator.

The use of radiation curing in the coating industry for producing high-quality coating materials is known from the prior art. In radiation curing, olefinically unsaturated compounds (monomers, oligomers, polymers, prepolymers), i.e. compounds containing C=C double bonds as structural elements, are cured by exposure to high-energy radiation, for example UV light or electron beams. The actual radiation curing process is sometimes preceded by physical drying.

It is also known that particularly high-quality coatings are obtained in radiation curing when the olefinically unsaturated starting compounds used contain polyurethane groups as further structural elements. Unsaturated radiation-curable urethane acrylates are known from Manfred Bock (Ed. Ulrich Zorill), "Polyurethane für Lacke und Beschichtungen", Hannover 1999, pages 73–74.

U.S. Pat. No. 3,979,270 describes a process for the curing of amine derivatives of reaction products of acrylated epoxidized soybean oil in which curing is carried out by high-energy radiation.

DESCRIPTION OF THE INVENTION

The problem addressed by the present invention was to provide a process for the production of polymers with excellent properties, more particularly in regard to impact strength, hydrophobia, chemical stability and resistance to water or water vapor. In addition, their special performance properties would enable these polymers to be used as matrix materials for composites.

The problem stated above has surprisingly been solved by a process in which OH-functional oleochemical compounds, which consist of reaction products of epoxidized fatty acid esters and/or epoxidized triglycerides with acrylic acid and/or methacrylic acid and which therefore contain both one or more hydroxyl groups and one or more C=C double bonds per molecule, are reacted with aliphatic and/or aromatic isocyanates (which in the context of the invention are understood to be any isocyanates known to the relevant expert, i.e. compounds which contain one or more —N=C=O— groups) and the compounds thus obtained—hereinafter referred to in short as "polyurethanes" (a*)—are subsequently subjected to radical post-crosslinking in the presence of a radical initiator (b).

The present invention relates to a process for the production of radically post-crosslinked polymers, characterized in that, in a first stage, one or more compounds (a) which are reaction products of epoxidized fatty acid esters and/or epoxidized triglycerides with acrylic acid and/or methacrylic acid are converted into the corresponding polyurethanes (a*) by reaction with aliphatic and/or aromatic isocyanates and, in a second stage, the polyurethanes (a*) thus produced are subsequently subjected to radical post-crosslinking in the presence of at least one radical initiator (b).

The term "subsequently" in the context of the present invention simply means that the second stage of the process according to the invention follows the first stage. It is not intended to signify any limitation in the time sense. Accordingly, the second stage of the process according to the invention may be carried out both immediately after the first stage and—depending on the intended application—after storage of the intermediate product (a polyurethane) obtained in the first stage, the storage time being basically unlimited.

The production of epoxidized fatty acid esters or epoxidized triglycerides has been known for some time. To this end, esters of olefinically unsaturated fatty acids or triglycerides which contain olefinically unsaturated fatty acids as fatty acid units are subjected to epoxidation, one or more double bonds per molecule being converted into oxirane groups.

Preferred fatty acid units of the fatty acid esters to be epoxidized are $C_{12-24}$ carboxylic acids which contain at least one olefinic double bond in the molecule. The triglycerides to be epoxidized are preferably triglycerides where at least one fatty acid unit per triglyceride molecule contains at least one olefinic double bond.

Examples of suitable epoxidized triglycerides are the epoxidation products of the following unsaturated oils: soybean oil, linseed oil, tall oil, cottonseed oil, peanut oil, palm oil, sunflower oil (from old and new plants), rapeseed oil and neatsfoot oil. Production is carried out in particular by reacting the unsaturated oils mentioned with performic acid or peracetic acid. Preferred triglycerides are those with an iodine value of 50 to 200 which are converted by epoxidation of most of the olefinic double bonds into epoxides with an epoxide oxygen content of 3 to 10% by weight.

Particularly preferred epoxidized triglycerides are epoxidized soybean oil (for example "Edenol D 81", a product of Cognis Deutschland GmbH and formerly of Henkel KGaA) and epoxidized linseed oil (for example "Edenol B 316", a product of Cognis Deutschland GmbH and formerly of Henkel KGaA).

The addition of acrylic and/or methacrylic acid onto the epoxidized fatty acid esters or epoxidized triglycerides mentioned to give the compounds (a) is known per se to the expert. It may be carried out in such a way that the oxirane rings are completely or partly opened. In the event of partial ring opening, preferably at least 50% of the oxirane rings are opened. In a particularly preferred embodiment, however, the addition of acrylic and/or methacrylic acid onto the epoxidized fatty acid esters or epoxidized triglycerides mentioned is carried out in such a way that more or less all the oxirane rings are opened and converted into HO—$CH_2$—$CH_2$—OR groups in which R is an acrylate or methacrylate residue.

In a particularly preferred embodiment of the present invention, the ring opening product of epoxidized soybean oil with acrylic acid which has a hydroxyl value of about 158 mg KOH/g substance is used as the acrylated oil (a). This acrylate is first reacted with aromatic and/or aliphatic isocyanates, a catalyst, for example an organotin compound, preferably being used in the case of the aliphatic isocyanates.

As already mentioned, one or more (meth)acrylated compounds (a) are subjected to a two-stage treatment in the process according to the invention, namely:
   first a reaction with aliphatic and/or aromatic isocyanates
   and then radical post-crosslinking of the polyurethanes (a*) obtained in the presence of at least one radical initiator (b).

The choice of the isocyanates is not subject to any particular limitations. In principle, therefore, any isocyanates known to the relevant expert, i.e. compounds containing one or more —N=C=O— groups, may be used.

Diisocyanates, oligo- or polyisocyanates and mixtures of these compounds are preferably used. Polyisocyanates in the context of the invention include, for example, adducts of diisocyanates with trimethylolpropane, biurets, uretdiones (cyclodimerized isocyanates), isocyanurates (cyclotrimerized isocyanates), allophanates, carbodiimide-based isocyanates and the like (with regard to expert knowledge on the subject of di- and polyisocyanates, reference is made purely by way of example to: Ullmanns Encyklopädie der technischen Chemie, Vol. 19, 4th Edition, Weinheim 1980, pages 302–304 and to Kirk-Othmer, Encyclopedia of Chemical Technology, 4th Edition, New York 1995, Volume 14, pages 902–934 and finally to Gerhard W. Becker [Ed.], Kunststoff-Handbuch, Vol. 7: "Polyurethane" [edited by Günter Oertel], 3rd Edition, Munich 1993, pages 11–21, 76–103). Particular reference is made to commercially available polyisocyanates, for example polymer-MDI and the like which are commercially available in various degrees of polymerization.

Preferred diisocyanates are compounds with the general structure O=C=N—X—N=C=O where X is an aliphatic, alicyclic or aromatic radical, preferably an aliphatic or alicyclic radical containing 4 to 18 carbon atoms.

Suitable diisocyanates are, for example, 1,5-naphthylene diisocyanate, 4,4'-diphenylmethane diisocyanate (=methylene diphenylene diisocyanate, MDI), hydrogenated MDI ($H_{12}$MDI, a cycloaliphatic compound), xylylene diisocyanate (XDI), tetramethyl xylylene diisocyanate (TMXDI), 4,4'-diphenyldimethylmethane diisocyanate, di- and tetraalkyl diphenylmethane diisocyanate, 4,4'-dibenzyl diisocyanate, 1,3-phenylene diisocyanate, 1,4-phenylene diisocyanate, the isomers of toluene diisocyanate (TDI, more particularly the technical isomer mixture of essentially 2,4- and 2,6-toluene diisocyanate), 1-methyl-2,4-diisocyanatocyclohexane, 1,6-diisocyanato-2,2,4-trimethylhexane, 1,6-diisocyanato-2,4,4-trimethyl hexane, 1-isocyanatomethyl-3-isocyanato-1,5,5-trimethyl cyclohexane (isophorone diisocyanate=IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexamethylene diisocyanate (HDI), dicyclohexylmethane diisocyanate, cyclohexane-1,4-diisocyanate, ethylene diisocyanate, phthalic acid-bis-isocyanatoethyl ester, diisocyanates containing reactive halogen atoms, such as 1-chloromethylphenyl-2,4-diisocyanate, 1-bromomethylphenyl-2,6-diisocyanate, 3,3-bis-chloromethyl-ether-4,4'-diphenyl diisocyanate. Sulfur-containing polyisocyanates are obtained, for example, by reaction of 2 mol hexamethylene diisocyanate with 1 mol thiodiglycol or dihydroxydihexyl sulfide. Other important diisocyanates are trimethyl hexamethylene diisocyanate, 1,4-diisocyanatobutane, 1,12-diisocyanatododecane and dimer fatty acid diisocyanate ("Sovermol DD1 1410", a product of Cognis Deutschland GmbH and formerly of Henkel KGaA). Particularly suitable diisocyanates are tetramethylene, hexamethylene, undecane, dodecamethylene, 2,2,4-trimethylhexane, 1,3-cyclohexane, 1,4-cyclohexane, 1,3- or 1,4-tetramethyl xylene, isophorone, 4,4-dicyclohexyl methane and lysine ester diisocyanate.

One embodiment of the present invention is characterized by the use of isocyanates of relatively high functionality, i.e. isocyanates with an average NCO functionality of at least 2.0. These include in particular all commercially available polyisocyanates (for example polymer-MDI and the like and the polyisocyanates of formula 1 to 7 disclosed in EP-A438 836) which have an NCO functionality above 2.0. The expert speaks in terms of an average NCO functionality because the corresponding isocyanates of relatively high functionality do not necessarily have to be present in the form of chemically uniform "individuals", such as cyclotrimerized isocyanates for example, but instead are often mixtures of different chemical individuals each with defined NCO functionalities, particularly in the case of commercially available technical products.

In the reaction of the (meth)acrylated compounds (a) with aliphatic and/or aromatic isocyanates to form the polyurethanes (a*), the reaction ratios between the components (a) and the isocyanates are selected so that the equivalent NCO:OH ratio is in the range from 0.03:1 to 1.2:1 and preferably of the order of 0.4:1.

In a preferred embodiment of the present invention, a combination of at least one compound (a) with at least one compound (c) is used in the first stage of the process according to the invention, with the proviso that (c) is selected from polyol esters containing two or more C=C double bonds per molecule. It is expressly pointed out in this connection that the compounds (c) are substances which do not fall under the definition of the substances (a) to be used in accordance with the invention, i.e. which are different from those substances (a). The polyol esters (c) may be both full esters and partial esters with the above-mentioned proviso in either case that two or more C=C double bonds per molecule must be present per molecule of polyol ester. If components (c) containing one or more free hydroxyl groups besides the C=C double bonds are used, the foregoing observations on the equivalent NCO:OH ratio are applicable in the sense that they apply to the sum of the compounds (a) and (c) and not just to the compounds (a) alone. Polyurethanes which may be termed a mixture of (a*) and (c*) are thus formed in the first stage of the process according to the invention, (a*) having the meaning mentioned above and (c*) analogously signifying the polyurethanes arising out of the reaction of the polyol esters (c) with isocyanates which contain one or more free hydroxyl groups besides the C=C double bonds.

One embodiment is characterized by the use of compounds (c) obtainable by esterification of polyols containing 2 to 6 OH groups with acrylic and/or methacrylic acid. In a preferred embodiment, the compounds (c) contain as polyol units polyols containing 2 to 6 OH groups which have a molecular weight below 1,000. Examples of suitable polyol units belonging to this group are ethylene glycol, propylene glycol, butanediol, neopentyl glycol, glycerol, trimethylol propane, sugars such as, for example, pentaerythritol, sorbitol or glucose and polyalkylene glycols.

A particularly preferred compound (c) is dipropylene glycol diacrylate. It is also pointed out that the polyol esters (c) to be used in accordance with the invention may be used individually or in combination with one another.

In another preferred embodiment of the present invention, a combination of at least one polyurethane (a*) with at least one of the polyol esters (c) mentioned is used in the second stage of the process according to the invention. The compounds (c) used in the second stage may be both compounds specifically added to the compounds (a*) and compounds (c) which, although used in the first stage, remained unchanged in the course of the urethanization reaction because they were free from hydroxyl groups.

The post-crosslinking of the polyurethanes (a*) obtained in the first stage of the process according to the invention is carried out in the presence of at least one radical initiator (b). Basically, the choice of this initiator is not critical. However, an organic peroxide is preferably used as the radical initiator. Organic peroxides are commercially available in large numbers. Reference is made by way of example to the substances marketed by Peroxid-Chemie GmbH, more particularly methyl ethyl ketone peroxide (MEKP), acetyl acetone peroxide, cyclohexanone peroxide, dibenzoyl peroxide, tert.butyl peroxybenzoate, bis-(4-tert.butylcyclohexyl)-peroxydicarbonate, dimyristyl peroxydicarbonate, 2,5-dimethyl-2,5-di-(2-ethylhexanoylperoxy)-hexane, tert.amylperoxy-2-ethyl hexanoate, methyl isobutyl ketone peroxide, tert.butylperoxy-2-ethyl hexanoate (TBPEH), cumene hydroperoxide, tert.butylperisononanoate (TBPIN), tert.butylperoxybenzoate, tert.butylcumyl peroxide. MEKP, TBPEH and TBPIN are particularly preferred.

In one embodiment, the post-crosslinking of the polyurethanes (a*) obtained in the first stage of the process according to the invention is carried out in the presence of 0.1 to 10% by weight—based on the polyurethane (a*) used—of one or more radical initiators (b). The post-crosslinking step may be carried out by any of the relevant methods known to the expert.

At low to medium temperatures in the range from about 20 to 100° C. and more particularly 20 to 70° C., the post-crosslinking step is preferably carried out in the presence of a catalyst (=reaction accelerator). Preferred catalysts are transition metal compounds (d). The quantity of transition metal compound used—metal content of the transition metal compound based on the polyurethane obtained in the first stage of the process according to the invention—is 0.01 to 1,000 ppm. Basically, there are no particular limitations as to the type of transition metal compound used. Accordingly, any transition metal compounds known to the expert may in principle be used for the purposes of the teaching of the present invention. In one embodiment, transition metal salts, preferably salts based on organic acids containing 6 to 22 carbon atoms, are used as the transition metal compounds. Another embodiment is characterized by the use of transition metal compounds of which the metals are selected from the group consisting of cobalt, zirconium, iron, lead, manganese, nickel, chromium, vanadium, cerium, titanium and tin. A particularly preferred catalyst is cobalt(II) octoate which is used in particular in the form of a solution, for example in phthalate.

In another embodiment, the post-crosslinking step is carried out in the absence of a catalyst at temperatures in the range from 60 to 160° C. and more particularly at temperatures in the range from 120 to 160° C. This special form of crosslinking may be regarded as hot curing. The brief heating to temperatures of about 150° C. is of particular advantage in that, typically, reaction times of only a few minutes are required at those temperatures. A particular advantage of hot curing is that post-crosslinkable resins containing components (a*)—if desired in combination with (c) and/or (c*)—and also (b) and optionally (e) are far more stable in storage than systems additionally containing component (d).

In one embodiment, the second stage of the process according to the invention is carried out in the presence of one or more compounds (e) capable of radical copolymerization with the unsaturated polyurethanes (a*). Suitable compounds (e) are, in particular, substances containing one C=C double bond per molecule, preferably acrolein, acrylamide, vinyl acetate and styrene. These compounds may be used individually or in the form of mixtures with one another.

In one embodiment, the first and/or second stage of the process according to the invention is carried out in the presence of up to 20% by weight of additives typical of plastics—% by weight of the sum of all plastics additives, based on the total quantity of compounds (a) used. Additives such as these include, for example, thickeners, flow control agents, defoamers, lubricants, fillers, UV stabilizers and are sufficiently well-known to the expert from paint and coating technology. It is important to ensure that the additives used are largely free from hydroxyl groups where they are used in the first stage of the process so that they do not react off with the isocyanates used in this stage.

In one embodiment, a mixture of the polyurethanes (a*) obtained in the first stage of the process according to the invention in combination with the desired radical initiators (b) and optionally the desired compounds (c) to (e) is applied in the required layer thickness to a solid substrate and the post-crosslinking step is subsequently carried out—immediately or after storage. Suitable solid substrates are, in particular, wood, paper, plastic surfaces, mineral building materials, such as cement bricks or cement fiber boards, metals or coated metals. If desired, the post-crosslinking step, which may also be referred to as curing, may be repeated one or more times. The application of the polyurethanes (a*) in admixture with the desired radical initiators (b) and optionally the desired compounds (c) to (e) to the solid substrate is carried out in known manner, for example by spray coating, trowelling, knife coating, brush coating, roller coating or casting. The coating thickness is generally in the range from 3 to 500 g/m$^2$ and more particularly in the range from 10 to 200 g/m$^2$ or wet film thicknesses of about 3 to 500 μm and more particularly 50 to 200 μm. The coating may be applied both at room temperature and at elevated temperature, but more particularly not above 100° C.

In another embodiment of the process according to the invention, the second stage of the process is carried out by impregnating synthetic and/or natural fibers with a mixture of components (a*), (b) and optionally (c) and/or (c*) and/or (e) and optionally plastics additives and then carrying out the radical crosslinking step. This procedure is based on so-called prepreg technology. A prepreg is a semifinished product preimpregnated with thermoplastic or thermoset material which is converted into the end product in another processing step. To produce prepregs, fibers are impregnated with a resin matrix in suitable installations. The prepregs may then either be processed to the desired end products either immediately after their production or after storage for a certain period. Accordingly, the objective of this particular embodiment of the invention is to provide fiber composites of fibers and a matrix material in which the matrix material is a radically post-crosslinked polymer obtainable by the process according to the invention.

The present invention also relates to the use of polymers obtainable by the process according to the invention as matrix material for composites based on synthetic and/or natural fibers.

The present invention also relates to a polymer-based material obtainable by a process in which, in a first stage, at least one or more compounds (a) which are reaction products of epoxidized fatty acid esters and/or epoxidized triglycerides with acrylic acid and/or methacrylic acid are converted into the corresponding polyurethanes (a*) by reaction with aliphatic and/or aromatic isocyanates and, in a second stage, the polyurethanes (a*) thus produced are subsequently subjected to radical post-crosslinking in the presence of at least one radical initiator (b).

The foregoing observations on the process according to the invention apply in regard to the individual parameters and the substances compulsorily or optionally used in the production of the material according to the invention.

In another embodiment, the production of the polymer-based material in the second stage is carried out in the presence of synthetic and/or natural fibers on the lines of the prepreg technology mentioned above. Basically, no particular limitations apply to the fibers. Thus, both synthetic fibers, such as glass fibers, carbon fibers, metal fibers and the like, and natural fibers may be used. According to the invention, preferred fibers are those which at least partly but preferably completely contain natural fibers. These natural fibers may be used in the form of short fibers, yarns, rovings or preferably sheet-form textiles in the form of nonwovens, needle-punched nonwovens, random laid nonwovens, woven fabrics, laid fabrics or knitted fabrics. According to the invention, natural fibers are preferably selected from flax, hemp, straw, wood wool, sisal, jute, coconut, ramie, bamboo, bast, cellulose, cotton or wool fibers, animal hair or fibers based on chitin/chitosan and combinations thereof. Materials partly or completely containing flax fibers are preferred. The percentage by weight of fibrous material in the prepregs is between 10 and 70% by weight, based on the total quantity of compounds (a), (b) and optionally (c) used.

The fibers may be contacted with the matrix by any methods known to the expert in order to obtain the prepregs. The fibers are preferably dipped in the matrix but may also be sprayed with the matrix. Mixtures containing (a*), (b) and optionally (c) which have a Brookfield viscosity of 600 to 1,400 mPas (as measured with spindle 5 at 10 r.p.m.) are preferably used. The viscosity values are all based on the application temperature. The matrix is applied to the fibers at temperatures of preferably 40 to 80° C. In one particularly advantageous embodiment, the matrixes selected have a Brookfield viscosity of 600 to 1,200 mPas at a temperature of 65° C. This ensures that the matrixes do not yet cure completely. Instead, the prepregs initially obtained can still be molded as required which simplifies their subsequent processing. In addition, the prepregs do not cure as quickly in air at room temperature as known prepregs and thus show distinctly increased stability in storage.

The materials obtainable as just described where the second stage of the production process is carried out in the presence of synthetic and/or natural fibers may be termed fiber composites. By virtue of their excellent performance properties, these fiber composites have a number of applications. Accordingly, the present invention also relates to the use of these fiber composites for the production of structural components for vehicle and aircraft construction, the building industry, window manufacture, the furniture industry, the electronics industry, sports equipment, toys, machine construction, the packaging industry, agriculture or the safety sector.

EXAMPLES

A) Substances Used

A1) Products of Cognis Deutschland GmbH
Photomer 3005 F:
Ring opening product of epoxidized soybean oil with acrylic acid
Photomer 4226:
Dipropylene glycol diacrylate
A2) Other Products
Beschleuniger ("accelerator") C-101:
Solution of cobtalt(II) octoate in phthalate; Co content=1% by weight (Peroxid-Chemie GmbH)
Vestanat IPDI:
Isophorone diisocyanate; NCO content=37.5–37.8% (Hüls AG)
TBPIN:
Tert.butyl perisononanoate (Peroxid-Chemie GmbH)
TBPEH:
Tert.butylperoxy-2-ethylhexanoate (Peroxid-Chemie GmbH)
MEKP:
Methyl ethyl ketone peroxide (Peroxid-Chemie GmbH)

B) Production of the Polyurethanes

Stage 1 of the Process According to the Invention

Intermediate Product 1 (IP 1)

100 g of isophorone diisocyanate were added dropwise over a period of 30 minutes at 80° C. to a mixture of 700 g of Photomer 3005 F and 300 g of Photomer 4226. The mixture was then heated to 80° C. and stirred at that temperature for 30 mins. After cooling, the product was obtained as a yellow-brown liquid (hereinafter referred to as intermediate product 1).

Intermediate Product 2 (IP 2)

50 g of isophorone diisocyanate were added dropwise over a period of 30 minutes at 80° C. to a mixture of 700 g of Photomer 3005 F and 300 g of Photomer 4226. The mixture was then heated to 80° C. and stirred at that temperature for 30 mins. After cooling, the product was obtained as a yellow-brown liquid (hereinafter referred to as intermediate product 2).

C) Radical Post-Crosslinking

Stage 2 of the Process According to the Invention

Example 1

100 parts by weight of intermediate product 1 were mixed with 2 parts by weight of TBPIN and TBPEH. The mixture was then cured for 30 minutes at 140° C. The polymer obtained had a Shore D hardness of 78.

Example 2

4 parts by weight of MEKP and 0.25 part by weight of Beschleuniger C-101 were added to 100 parts by weight of intermediate product 1. The mixture was then cured for 30 minutes at 75° C. The product obtained had a Shore D hardness of 75.

Example 3

4 parts by weight of MEKP and 0.25 part by weight of Beschleuniger C-101 were added to 100 parts by weight of intermediate product 2. The mixture was then cured for 30 minutes at 75° C. The product obtained had a Shore D hardness of 65.

Example 4

4 parts by weight of MEKP and 0.25 part by weight of Beschleuniger C-101 were added to 100 parts by weight of intermediate product 1. The mixture was then cured for 6 days at 20° C. The product obtained had a Shore D hardness of 45.

What is claimed is:
1. A process for the production of radically post-crosslinked polymers, comprising the steps of: (1) forming a polyurethane (a*) by reacting a compound (a) with an aliphatic and/or an aromatic isocyanate and a compound (c)

wherein compound (a) is the product of the reaction of an epoxidized fatty acid ester and/or an epoxidized triglyceride with acrylic acid and/or methacrylic acid and wherein compound (c) is a polyol ester having two or more C=C double bonds per molecule; (2) forming a crosslinked polyurethane by reacting the polyurethane (a*) with a radical initiator (b).

2. The process of claim 1 wherein the radical initiator is selected from the group consisting of tert-butylperisononaoate, tert-butylperoxy-2-ethylhexanoate and methyl ethyl ketone peroxide.

3. The process of claim 1 wherein step (2) is carried out in the presence of a transition metal compound (d).

4. The process of claim 1 wherein step (2) is carried out in the presence of compound (e) wherein compound (a) is selected from the group consisting of acrolein, acrylamide, vinyl acetate and styrene.

5. The process of claim 1 wherein step (1) and/or (2) is carried out in the presence of up to 20% by weight of an additive selected from the group consisting of thickeners, flow control agents, defoamers, lubricants, fillers, and UV stabilizers wherein the weight of the additive is based on the total weight of the compound (a).

* * * * *